United States Patent

Ramler et al.

[11] 4,037,112
[45] July 19, 1977

[54] APPARATUS FOR CROSSLINKING ULTRAVIOLET LIGHT CURABLE COATINGS

[75] Inventors: Warren J. Ramler, Elmhurst; James K. Lackore, Joliet, both of Ill.

[73] Assignee: PPG Industries, Inc., Pittsburgh, Pa.

[21] Appl. No.: 561,747

[22] Filed: Mar. 25, 1975

[51] Int. Cl.² ............................................. B01K 1/00
[52] U.S. Cl. ................................................. 250/527
[58] Field of Search ................. 250/527; 240/41.35 A

[56] References Cited
U.S. PATENT DOCUMENTS

2,288,352   6/1942   Hendeson ................... 240/41.35 A
3,826,014   7/1974   Helding ....................... 250/527

Primary Examiner—Howard S. Williams
Attorney, Agent, or Firm—George D. Morris

[57] ABSTRACT

A substrate coated with an ultraviolet light curable coating composition is passed under the substantially elliptical cylindrical reflectors of an ultraviolet light coatings processor wherein sources of ultraviolet light are located at the foci nearest the vertices of the reflectors. It has been found that undercuring resulting from vibration of the coated substrate toward and away from the reflectors during passage can be eliminated by maintaining the mean point of vibration more remote from the reflectors than the conjugate foci of the reflectors.

7 Claims, 5 Drawing Figures

APPARATUS FOR CROSSLINKING ULTRAVIOLET LIGHT CURABLE COATINGS

The use of ultraviolet light coating processors to cure ultraviolet light sensitive coatings is becoming more widespread. Advantages of ultraviolet light curing include the ability to use resin systems which have little or no volatile solvents, the speed with which cure may be accomplished and simplicity of operation. The present invention is an improvement in ultraviolet light coating processors and the method of curing coatings using such processors.

For a better understanding of the invention, reference may be made to the drawings wherein like numerals refer to like parts in which.

Ultraviolet light coating processors may advantageously employ four concave substantially elliptical cylindrical reflectors having first foci and second foci located more remotely from the reflectors than the first foci. The second foci of two of the reflectors are superimposed to form a first column focus and the second foci of the other two reflectors are similarly superimposed to form a second common focus. Both common foci are located in a plane perpendicular to the plane of symmetry of the reflector system, which plane of symmetry is parallel to the axes of the substantially elliptical cylindrical reflectors. The common foci are spaced apart by a distance in the range of from about 10 percent to about 50 percent of the distance between the two extreme first foci. More often the spacing is in the range of from about 20 percent to about 40 percent of the distance between the two extreme first foci. A spacing in the range of from about 25 percent to about 35 percent is preferred. The eccentricity of the substantially elliptical cylindrical reflectors is in the range of from about 0.2 to about 0.9. More often the eccentricity is in the range of from about 0.5 to about 0.8. An eccentricity in the range of from about 0.6 to about 0.75 is preferred. Such a configuration produces an intensity profile in the plane containing the common foci which roughly approximates a square wave and which contains two maxima separated by a central minimum.

When employing an ultraviolet light coating processor such as described above, it is customary to pass the coated substrate under the reflectors such that the coating is in the plane containing the common foci. Often, however, the conveying means moving the coated substrate imparts to the coated substrate a vibratory motion toward and away from the reflectors as the coated substrate travels through the apparatus. Since, for reasons of economy, the light intensity in the plane of containing the common foci is adjusted to be only slightly greater than the amount needed to cure the coating, the vibration has been found to cause parts of the coating to enter regions of insufficient intensity for too long a time during portions of its travel through the apparatus. The result is an insufficient cure of those parts of the coating. The usual parts of the coating adversely affected are those passing through regions where the intensity profile is at or near the central minimum.

It has now been discovered that in the plane of symmetry of the apparatus, the loss of intensity is much greater as one receeds from the plane containing the common foci in a direction toward the reflectors than a similar recession in the opposite direction. The coated substrate is therefore passed under the reflector system such that the mean position of the coating is located more remotely from the reflectors than the plane containing the common foci and such that the coating is exposed to ultraviolet light of sufficient intensity for a time sufficient to cure the coating during the passage.

Although the curing of the uncrosslinked coating composition (A-stage) may be carried out only until a gel (B-stage) if formed, it is generally preferred that curing should continue until the fully cured state (C-stage) is obtained where the coating has been crosslinked into a hard, infusible film. These fully cured films exhibit the high abrasion resistance and high mar resistance customarily associated with C-stage polymer films.

It is preferable during passage of the coated substrate under the reflector system that the distance of the mean position of vibration of the coating from the plane containing the common foci be in the range of from about 1 percent to about 40 percent of the distance the second foci are located from the vertices of their respective reflectors. From about 2 percent to about 25 percent is especially preferred.

Figure 1:
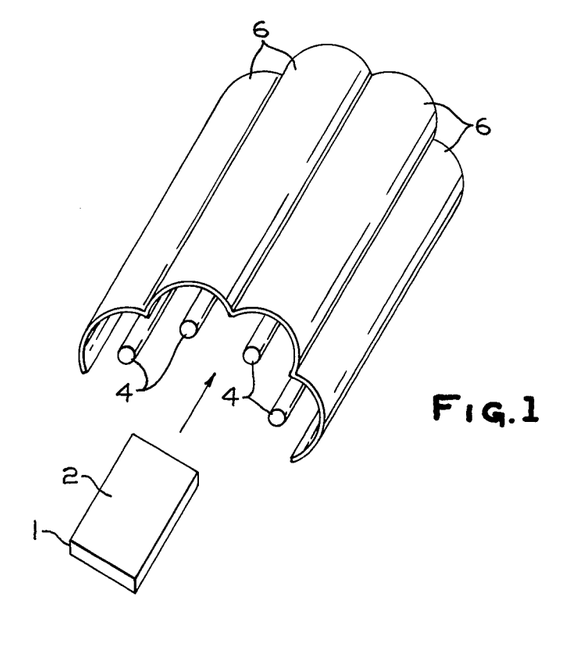
FIG. 1 shows a flat coated substrate passing beneath a cluster of ultraviolet light sources and their respective reflectors.

Referring now in more detail to the drawings, FIG. 1 shows a flat substrate 1 having thereon a coating 2 of ultraviolet light curable coating composition. The coated substrate is shown passing under a cluster of four ultraviolet light sources 4, each positioned at the first focus of substantially elliptical cylindrical reflectors 6.

Figure 2:
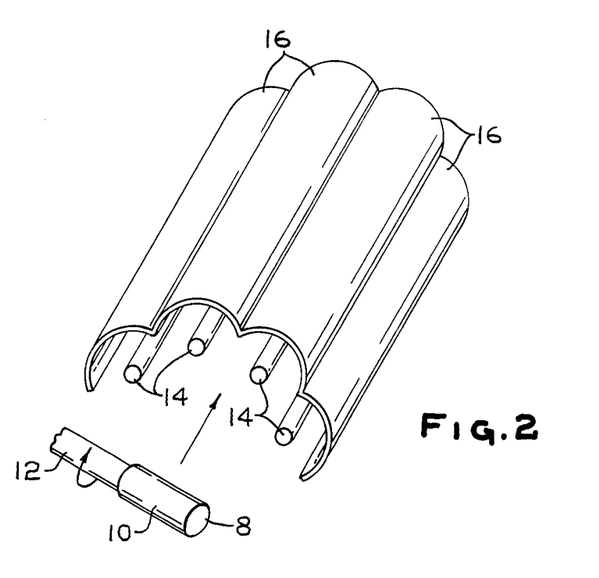
FIG. 2 shows a rotating righ circular cylindrical coated substrate passing beneath a cluster of ultraviolet light sources and their respective reflectors.

FIG. 2 shows a rotating right circular cylindrical substrate 8 mounted on mandrel 10 having thereon a coating 12 of ultraviolet light curable coating composition. The coated substrate is shown passing under a cluster of four ultraviolet light sources 14, each positioned at the first focus of substantially elliptical cylindrical reflectors 16.

Figure 3:
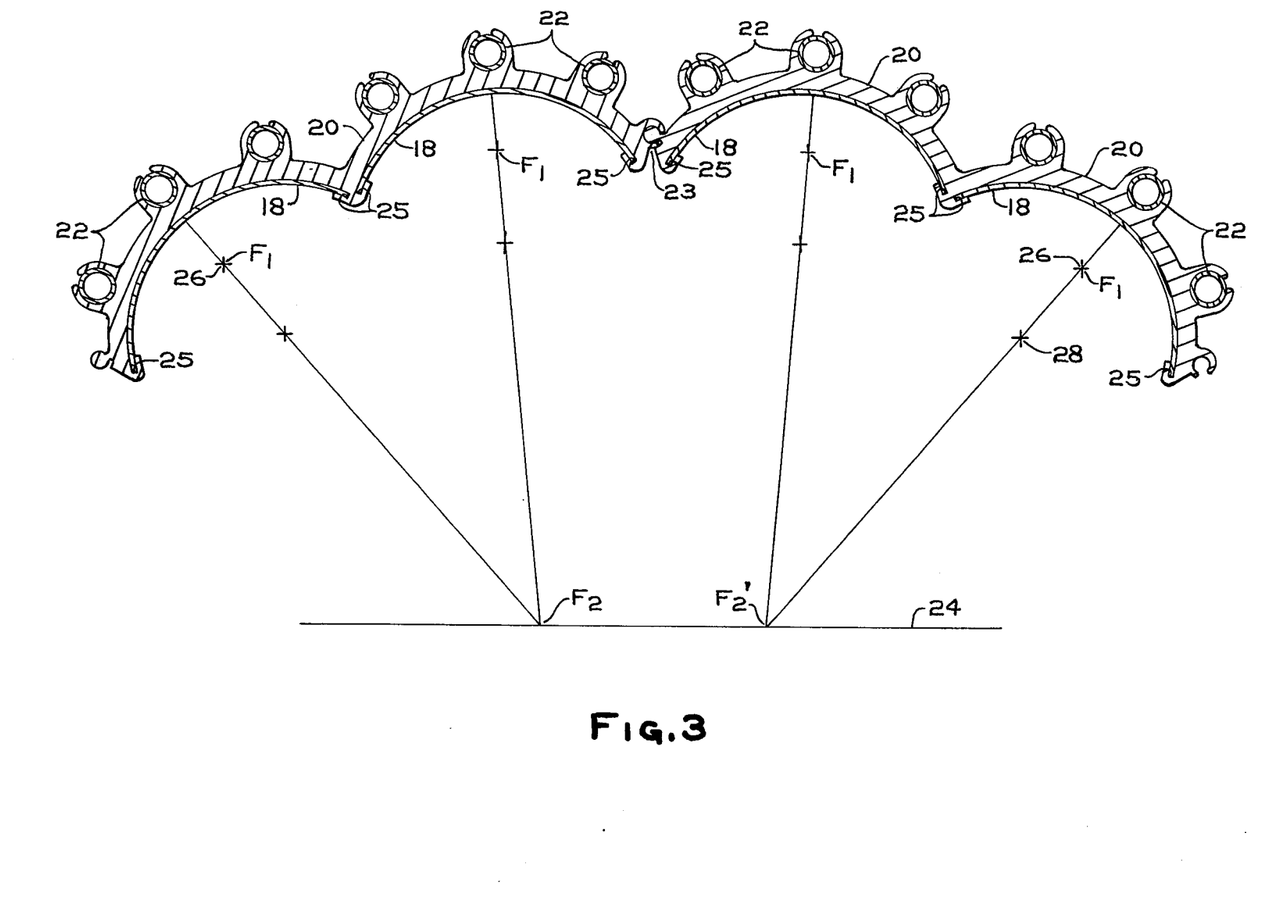
FIG. 3 shows a reflector system which may be employed in the practice of the invention.

FIG. 3 illustrates an optical system which may be utilized in the practice of the invention. The substantially elliptical cylindrical reflectors 18 are held in position by base members 20 which may also contain tubes 22 for circulating coolant therethrough. The base members 20 may also contain a knuckle system 23 permitting relative rotational movement between the base members. The reflectors may be bright aluminum sheet (e.g. "Alzak, " Aluminum Company of America) or other ultraviolet light reflective material and may be held in place by slots 25 in the base members 20. Each reflector has a first focus $F_1$, and a second focus more remotely located from the reflectors than the first foci. The second foci of two of the reflectors are superimposed to form a common focus $F_2$ and the second foci of the other two reflectors are superimposed to form common focus $F_2^1$. Both common foci lie in a plane 24 and are spaced apart by a distance in the range of from about 10 percent to about 50 percent of the distance between the two extreme first foci 26.

The eccentricity of the substantially elliptical cylindrical reflectors is in the range of from about 0.2 to about 0.9 and is calculated from the formula $$e = \frac{Z - z}{Z + z}$$

where $e$ is the eccentricity, $Z$ is the distance of the second focus from the vertex of the ellipse and $z$ is the distance of the first focus from the vertex of the ellipse. While precisely elliptical reflectors are often employed in the invention, shapes which substantially approximate an ellipse may be used so long as the aberrations introduced produce inconsequential effects upon the curing of ultraviolet light curable coatings. In most systems, a circle closely approximates an ellipse and may be used in lieu of a precise ellipse without introducing appreciable aberrations. Since most of the base members 20 are formed by extruding aluminum through a die, use of a circular arc permits easier fabrication of the die than if a precisely elliptical arc were employed. FIG. 3 illustrates the use of such circular arcs having centers 28 located on the major axes of the substantially elliptical cylindrical reflectors 18.

In the preferred embodiment, the base members 20 have circular arcs 3,969 centimeters in radius with centers 28 on the major axes of the substantially elliptical cylindrical reflectors 18. The reflectors themselves are sheets of Alzak aluminum having a thickness of about 0.074 centimeters. The first foci are located 2.223 centimeters from the vertices of their respective substantially elliptical cylindrical reflectors. The first and second common foci are located 13.738 centimeters from the vertices of their respective substantially elliptical cylindrical reflectors. The common foci are spaced 6.350 centimeters apart and are positioned equidistant from the plane of symmetry of the reflector system which is generally parallel to the four generally parallel first foci.

Figure 4:
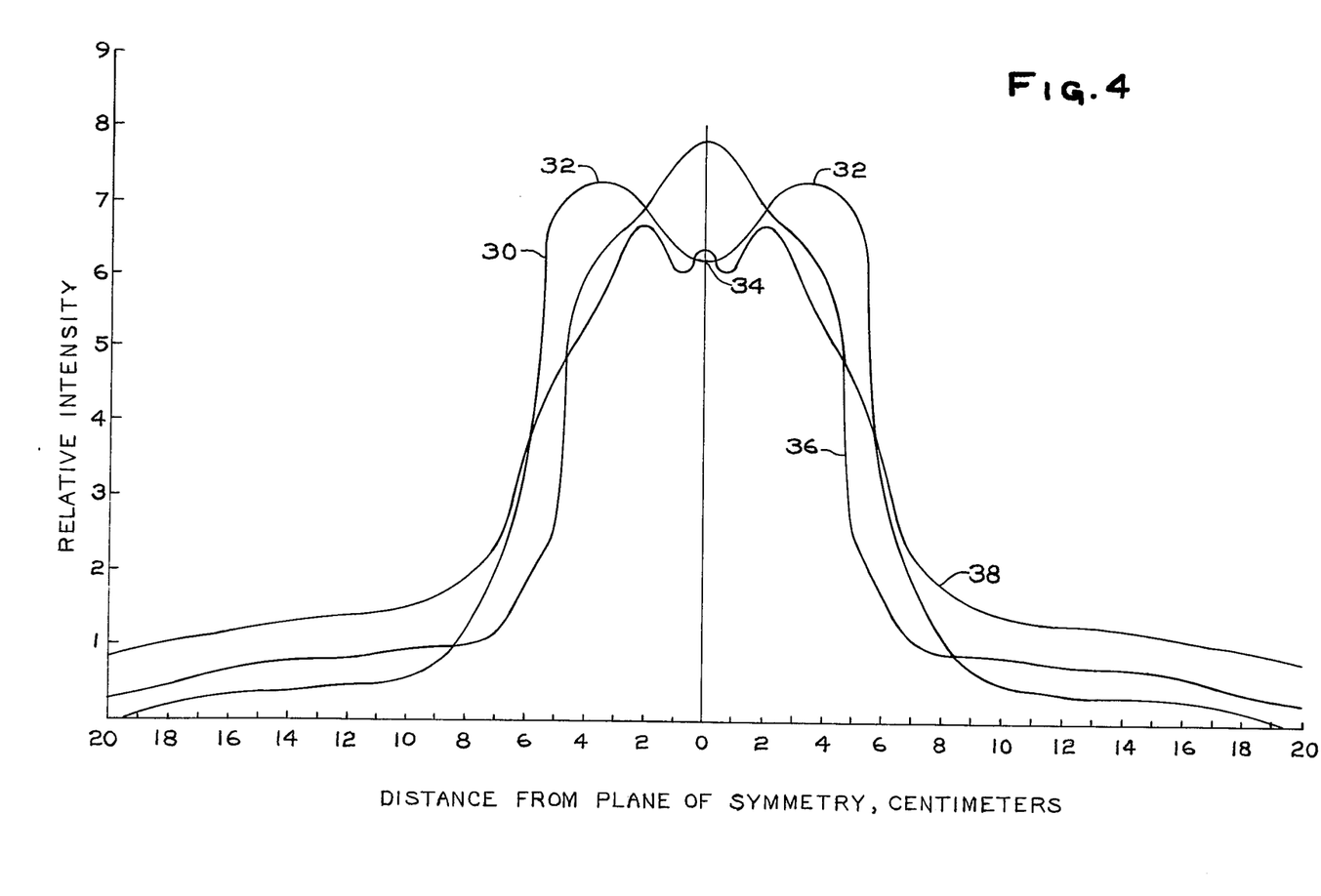
FIG. 4 shows the intensity profiles of the reflector system of FIG. 3.

FIG. 4 illustrates the intensity profiles obtained when generally parallel sources of equal intensity are located at the first foci. The intensity profile 30 at the plane containing the common foci approximates a square wave and has two maxima 32 separated by a central minimum 34. Also shown are the intensity profile 36 at points 2.54 centimeters more distant from the reflectors than the plane containing the common foci and the intensity profile 38 at points 5.08 centimeters more distant from the reflectors than the plane containing the common foci.

Figure 5:
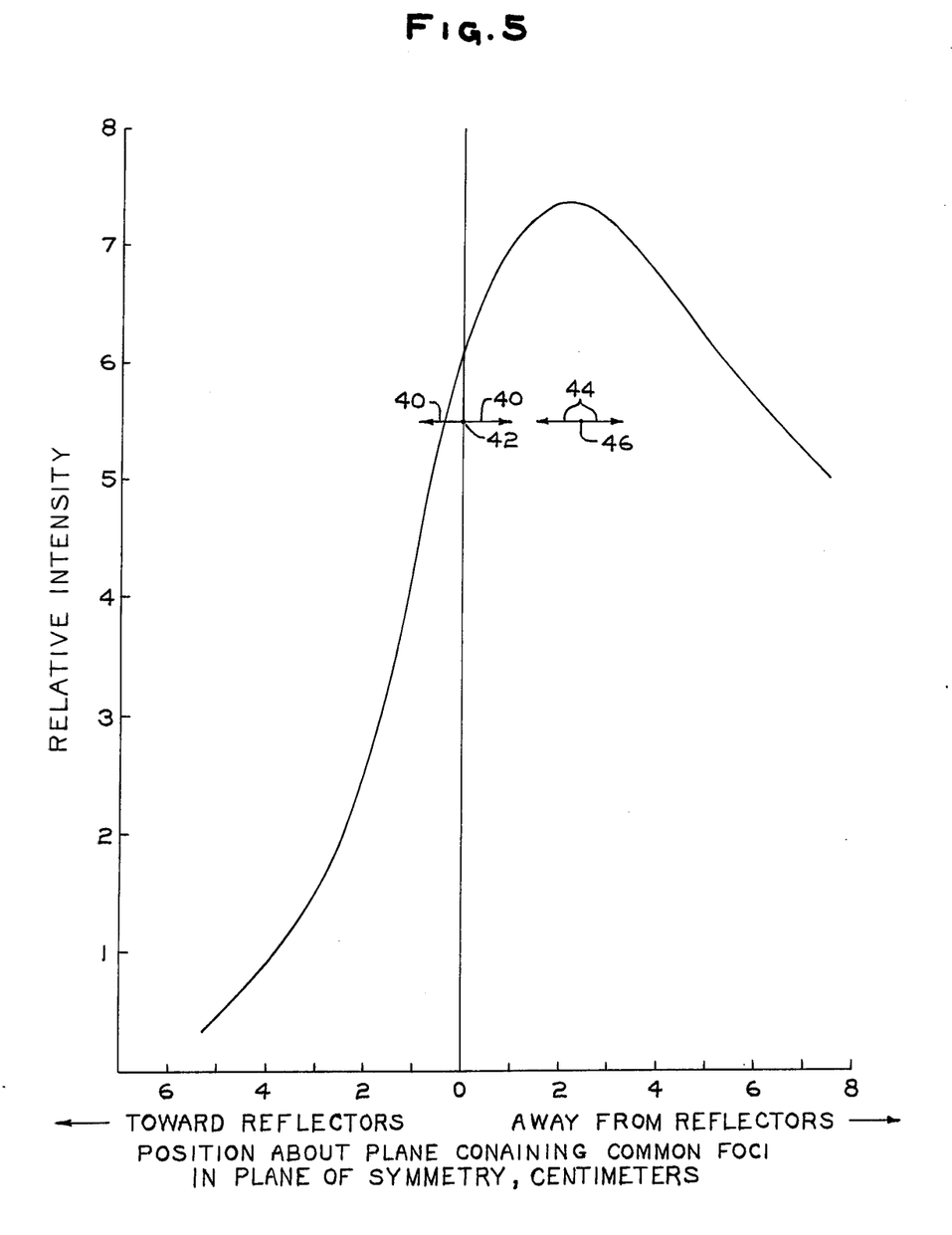
FIG. 5 shows variation of central intensity about the plane containing the common foci.

FIG. 5 shows the intensity in the plane of symmetry as the position relative to the plane containing the common foci is varied. From FIG. 6 it may be seen that the intensity is lost much more rapidly as the reflectors are approached from the plane containing the common foci than when receding from both the reflectors and such plane. The coating in the plane of symmetry vibrating toward and away from the reflectors with a mean position in the plane containing the common foci is more likely to receive insufficient ultraviolet light during passage under the reflector system than if the mean position were somewhat more remote from the reflectors. Satisfactory positions for the mean position may be determined by plotting vectors representing the maximum peak-to-peak values of vibration at the minimum relative intensity which produces a satisfactory cure of the coating during passage under the reflector system. The mean position should be such that the vectors remain in the region of sufficient relative intensity. Hence the mean position should be located away from the point of insufficient relative intensity by a distance at least equal to, and preferably slightly greater than the amplitude of vibration. This is illustrated in FIG. 5 wherein vectors 40 representing the maximum and minimum amplitudes of vibration about mean position 42 are plotted at the minimum acceptable relative intensity. One vector is seen to enter the region of unacceptable relative intensity. Vectors 44 of the same vibration about mean point 46 are seen to remain in the region of acceptable relative intensity. Of course, the mean position should nnot be so far away from the reflectors that a vector crosses the curve to the right of the maximum.

When the substrate is intentionally placed in a region of insufficient relative intensity for a portion of its passage under the reflector system, as is the case for the rotating coated cylindrical substrate of FIG. 2, the above procedure is modified by plotting the mean effective relative intensity in the plane of symmetry against position about the plane containing the common foci and plotting the vectors representing the maximum and minimum amplitudes of vibration at the minimum acceptable mean effective relative intensity. Location of acceptable positions for the mean position are then determined in a manner analogous to that described with respect to FIG. 5.

Although the above description has been made in terms of relative intensity, which is the quotient of the absolute intensity divided by a reference absolute intensity, the procedure may be carried out using absolute intensities themselves.

Substantially any ultraviolet light curable coating composition can be cured using the present invention. These ultraviolet light curable coating compositions contain at least one polymer, oligomer or monomer which is ultraviolet light curable. Examples of such ultraviolet light curable materials are unsaturated polyesters, acrylic (including the α-substituted acrylic) functional monomers, oligomers, and polymers, the epoxy resins in admixture with masked Lewis acids, and the aminoplasts used in combination with a compound which ultraviolet light converts to an acid. Examples of such a compound to be used wit aminoplast resins are the chloromethylated or bromomethylated aromatic ketones as exemplified by chloromethylbenzophenone.

The most cmmonly used ultraviolet light curable compounds contain a plurality of sites of ethylenic unsaturation which, under the influence of ultraviolet light become crosslinking sites through addition reactions. The sites of ethylenic unsaturation may lie along the backbone of the molecule or they may be present in side chains attached to the molecular backbone. As a further alternative, both of these arrangements may be present concurrently.

The ethylenically unsaturated polyesters consitute a preferred class of ultaviolet light curable polymer. These polyesters are ordinarily esterification products of ethylenically unsaturated polycarboxylic acids and polyhydric alcohols. Usually, the ethylenic unsaturation is in the alpha, beta position.

The ethylenically unsaturated polycarboxylic acids include maleic acid, fumaric acid, aconitic acid, itaconic acid, citraconic acid, mesaconic acid, muconic acid and dihydromuconic acid and halo and alkyl derivatives of such acids. The preferred acids are maleic acid and fumaric acid. Especially preferred is maleic acid. Mixtures of ethylenically unsaturated polycarboxylic acids may be used or only a single such acid may be employed. The anhydrides of these acids, where the anhydrides exist are, of course, embraced by the term "acid, " since the polyesters obtained therefrom are essentially the same whether the acid or anhydride is used in the reaction.

One or more saturated polycarboxylic acids may optionally be utilized in combination with the ethylenically unsaturated acid or anhydride in the preparation of unsaturated polyesters. Such acids, especially the saturated dicarboxylic acids, increase the length of the polyester without adding additional crosslinking sites, which is a desired feature in some polyesters. Saturated tricarboxylic acids and saturated acids of higher carboxylic functionality may be used to provide branching where this is desirable.

For purposes of the present invention, the aromatic nuclei of aromatic acids such as phthalic acid are generally regarded as saturated since the double bonds do no ordinarily react by addition as do ethylenic groups. Therefore, wherever the term "saturated" is utilized, it is to be understood that such term includes aromatic unsaturation or other form of unsaturation which does not react by addition, unless otherwise qualified.

Examples of useful saturated polycarboxylic acids include oxalic acid, malonic acid, succinic acid, methylsuccinic acid, 2,2-dimethylsuccinic acid, 2,3-diemthylsuccinic acid, hexylsuccinic acid, glutanic acid, 2-methylglutaric acid, 3-methylglutaric acid, 2,3-dimethylglutaric acid, 3,3-dimethylglutaric acid, 3,3-diethylglutaric acid, adipic acid, pimelic acid, suberic acid, azelaic acid, sebaccic acid, phthalic acid, isophthalic acid, terephtahalic acid, tetrachlorophthalic acid, 1,2-hexahydrophthalic acid, 1,3-hexahydrophthalic acid, 1,4-hexahydrophthalic acid, 1,1-cyclobutanedicarboxylic acid, 1,4-hexahydrophthalic acid, 1,1-cyclobutanedicarboxylic acid and trans-1,4-cyclohexanedicarboxylic acid. As in the case of the ethylenically unsaturated polycarboxylic acids, the anhydrides of the saturated acids, where anhydrides exist, are embraced by the term "acid" since the polyesters obtained therefrom are essentially the same.

The ethylenically unsaturated polycarboxylic acids are usually present in an amount in the range of from about 10 mole percent to about 100 mole percent of the polycarboxylic acids employed. Preferably, they are present in the range of from about 50 mole percent to about 100 mole percent.

The polyhydric alcohols useful in preparing ethylenically unsaturated polyesters include saturated polyhydric alcohols such as ethylene glycol, 1,3-propanediol, propylene glycol, 2,3-butane diol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane, 1,3-diol, 4,5-nonanediol, diethylene glycol, triethylene glycol, dipropylene glycol, neopentyl glycol, glycerol, pentaerythritol, erythritol, sorbitol, mannitol, 1,1,1-trimethylolpropane, trimethylolethane, and 2,2-dimethyl-33-hydroxypropyl 2,2-dimethyl-3-hydroxypropionate. Ethylenically unsaturated polyhydric alcohols such as 2-butene-1,4-diol may be used alone or in admixture with the saturated polyhydric alcohols. Of course, mixtures of saturated polyhydric alcohols or mixtures of unsaturated polyhydric alcohols may be employed. If unsaturated polyhydric alcohols are used to introduce ethylenic unsaturation into the polyester, the preparation of ethylenically unsaturated polycarboxylic acid may be reduced correspondingly, if desired.

The ethylenically unsaturated polyesters may optionally be capped with saturated monocarboxylic acids, ethylenically unsaturated monocarboxylic acids or mixtures of these. Examples of suitable saturated monocarboxylic acids are formic acid, acetic acid, propionic acid, isopropionic acid, butyric acid, isobutyric acid, sec-butyric acid, tert-butyric acid, valeric acid, caproic acid, isocaproic acid, enanthic acid, caprylic acid, pelargonic acid, capric acid, undecylic acid, lauric acid, myristic acid, palmitic acid and stearic acid. Examples of ethylenically unsaturated monocarboxylic acids which may be used are acrylic acid, α-chloroacrylic acid, methacrylic acid, ethacrylic acid, crotonic acid, tiglic acid, oleic acid, linoleic acid, linolenic acid, ricinoleic, erucic acid and sorbic acid.

Capping may also be accomplished using monohydric alcohols such as methyl alcohol, ethyl alcohol, n-butylalcohol, isobutyl alcohol, sec-butyl alcohol, tert-butyl alcohol, amyl alcohol, hexyl alcohol, heptyl alcohol, octyl alcohol, 2-ethylhexyl alcohol, decyl alcohol and allyl alcohol. Other materials which may be used for capping comprise compounds having other monofunctional groups which react with the terminal hydroxyl groups or the terminal carboxylic groups of the uncapped polyester. Exemplary compounds are alkyl isocyanates such as methyl isocyanate, ethyl isocyanate, propyl isocyanate; primary amines such as methyl amine, ethyl amine, propyl amine; secondary amines such as dimethyl amine, diethyl amine, methyl ethyl amine; acid chlorides such as acetyl chloride, propionyl chloride, and butyryl chloride.

If desired, no effort need be made to cap the ends of the polyester and capping or chain termination may be left to natural processes.

Polymers having ethylenic unsaturation in sidechains attached to the molecular backbone are usually prepared by including one or more monomers, which, when interpolymerized with other monomers, to form the polymer, provides reactive sites attached to the polymer along the backbone. Ethylenically unsaturated compounds having at least one functional group which will react with the reactive sites on the polymer backbone are then used to introduce the ethylenic unsaturation into the molecule. The usual reactive sites attached directly or indirectly to the polymer are hydroxy, amino, carboxy, carbamyl or epoxy. Hydroxy or carboxy are most often used. When the reactive sites are hydroxy, the ethylenically unsaturated compound usually has carboxy, haloformul (most often chloroformyl) or isocyanate functionality. When the reactive sites on the polymer are amino, the ethylenically unsaturated compound usually has isocyanato, haloformyl (again, most often chloroformyl) or epoxy functionality. When the reactive sites on the polymer are carboxy, the ethylenically unsaturated compound generally has hydroxy, epoxy or isocyanato functionality. When the reactive sites are carbamyl, they are usually reacted with formaldehyde to produce N-methylol carbamyl groups. The ethylenically unsaturated compound ordinarily contains carboxy, haloformyl or isocyanato functionality. When the reactive sites are epoxy (usually glycidyl), the ethylenically unsaturated compound generally has carboxy functionality.

The polymer having reactive sites attached thereto can itself be any of types, as for example, polyacrylates, polyamides, polyesters, polyethers or polyurethanes.

The term polyacrylate is used in its broadest sense to include not only polymerized unsubstituted acrylates, but also polymerized α-substituted acrylates, such as methacrylates, ethacrylates and α-chloroacrylates. Compounds from any of these subclasses may be used alone, but most often, compounds from two or more subclasses are interpolymerized.

Examples of suitable monomers which may be used in the preparation of the polyacrylate polymer include methyl acrylate, ethyl arcylate, propyl acrylate, isopropyl acrylate, butyl acrylate, isobutyl acrylate, sec-butyl acrylate, tert-butyl acrylate, amyl acrylate, hexyl acrylate, heptyl acrylate, octyl acrylate, 2-ethylhexyl acrylate, decyl acrylate, dodecyl acrylate, methyl methacrylate, ethyl methacrylate, propyl methacrylate, isopropyl methacrylate, butyl methacrylate, isobutyl methacrylate, sec-butyl methacrylate, tert-butyl methacrylate, amy methacrylate, hexyl methacrylate, heptyl methacrylate, octyl methacrylate, 2-ethylhexyl methacrylate, decyl methacrylate, dodecyl methacrylate methyl α-chloroacrylate, ethyl α-chloroacrylate, propyl α-chloroacrylate, hexyl α-chloroacrylate, octyl α-chloroacrylate, decyl α-chloroacrylate and dodecyl α-chloroacrylate. Esters of unsubstituted acrylic acid and methacrylic acid are most often used.

Acrylic monomers which introduce reactive sites to the polymer molecule are acrylic acid, 2-hydroxyethyl acrylate, 2-hydroxypropyl acrylate, 3-hydroxypropyl acrylate, glycidyl acrylate, acrylamide, 2-aminoethyl acrylate, methacrylic acid, 2-hydroxyethyl methacrylate, 2-hydroxypropyl methacrylate, 3-hydroxypropyl methacrylate, glycidyl methacrylate, methacrylamide, 2-aminoethyl methacrylate, 3-aminopropyl methacrylate and α-chloroacrylic acid.

Other ethylenically unsaturated monomers are often included. Examples of these compounds ar styrene and α-methylstyrene.

The amount of acrylic monomers which are used to introduce reactive sites to the polymer molecule may vary widely, but they are ordinarily present in the range of from about 3 percent to about 50 percent by weight of the ethylenically unsaturated monomers interpolymerized. An amount in the range of from about 4 percent to about 25 percent is most often the case.

Addition polymerization may be effectuated by combining the ethylenically unsaturated monomers with a free radical initiator and heating the mixture. Exemplary free radical initiators are organic peroxides such as ethyl peroxide and benzoyl peroxide; hydroperoxides such as methyl hydroperoxide, acyloins such as benzoin; certain azo compounds such as α,α'-azobisisobutyronitrile and γ,γ'-azobis(γ-cyanovaleric acid); persulfates; peracetates such as methyl peracetate and tert-butyl peracetate; peroxalates such as dimethyl peroxalate and di(tert-butyl) peroxalate; disulfides such as dimethyl thiuram disulfide and ketone peroxides such as methyl ethyl ketone. In lieu of the chemical free radical initiators, high energy ionizing particles irradiation, high energy ionizing electromagnetic radiation or actinic light may be used as a source of free radicals. High energy ionizing particle radiation includes accelerated electrons; highly accelerated nuclear particles such as protons, neutrons, alpha particles, deuterons and beta particles. High energy ionizing electromagnetic radiation includes X-rays and gamma rays. Actinic light includes ultraviolet light and photons less energetic than ultraviolet light. The polymerization may be accomplished in the presence or absence of an inert solvent. When chemical initiators are used, temperatures in the range of from about 75° F. to about 400° F. are generally employed. More often, temperatures in the range of from about 100° F. to about 300° F. are used.

When the polymer is a polyamide, polyester, polyether or polyurethane, the principles are analogous to those given for the polyacrylates. The known reactions for forming such polymers will, of course, be used instead of the addition polymerization reaction illustrated above for the polyacrylates.

Organic ultraviolet light curable acrylic oligomers, which may be used in the invention, generally comprise divalent, trivalent or tetravalen organic radicals whose bonds are satisfied with unsubstituted acrylyloxy or α-substituted acrylyloxy groups. The polyvalent radical may be aliphatic, cycloaliphatic or aromatic. Usually, the molecular weight of the oligomer is in the range of from about 170 to about 1000. Examples of such oligomers are the diacrylates and dimethyacrylates of ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, neopentyl glycol, 5,5-dimethyl-3,7-dioxanonane-1,9-diol and 2,2-dimethyl-3-hydroxypropyl 2,2-dimethyl-3-hydroxypriopionate; the triacrylates, trimethylacrylates, diacrylates and dimethacrylates of glycerol, 1,1,1-trimethylolpropane and trimethylolethane; and the tetracrylates, tetramethacrylates, triacrylates, trimethacrylates, diacrylates and dimethacrylates of pentacrythritol and erythritol. The acrylic groups on the oligomer molecules are usually the same, but they may be different as exemplified by the compound 2,2-dimethyl-1-acrylyloxy-3-methacrylyloxypropane.

Others examples of satisfactory acrylic oligomers are acylic polyester and acrylic polyamide molecules represented by the formulae (I)

and (II)

wherein n is an integer in the range of from 1 to 4;

each R independently represents a divalent aliphatic, cycloaliphatic or aromatic hyrocarbon radical having from 1 to 10 carbon atoms;

each R' independently represents hydro, methyl or ethyl;

and each A independently represents O or NH.

It is preferred that every A represent O. The polyester and polyamide oligomers represented by formula (I) may be prepared by reacting dicarboxylic acids or acid amides and dihydric alcohols ordiamines and then reacting the product with an unsubstituted acrylic acid or an α-substituted acrylic acid. The acrylic polyester and polyamide oligomers represented by formula (II) may be prepared by reacting a hydroxyfunctional monocarboxylic acid, a dimer, trimer or a tetramer of such acid, an amino functional monocarboxylic acid or a dimer, trimer or tetramer of such acid with an unsubstituted or α-substituted acrylic acid. When desired, the lactone may be used in lieu of the hydroxy functional monocarboxylic acid and the lactam may be used in plane of the amino functional monocarboxylic acid.

Vinyl monomers which crosslink with the compound containing a plurality of sites of ethylenic unsaturation to form thermosetting materials may be present in the coating composition. Vinyl monomers are especially used with the unsaturated polyesters. Examples of vinyl monomers which may be used are styrene, α-methylstyrene, divinylbenzene, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate and octyl methacrylate. The preferred vinyl monomers are liquid compounds miscible with the first component. These vinyl monomers are preferably free of non-aromatic carbon-carbon conjugated double bonds. The use of one or more vinyl monomers is desirable because the greater mobility of the smaller vinyl monomer molecule, as compared to the much larger first component, allows crosslinking to proceed faster than if the vinyl monomer were absent. Another benefit is that the vinyl monomer usually acts as a reactive solvent for the first component thereby providing coating compositions having a satisfactorily low viscosity without using an inordinant amount, if any at all, of volatile, non-reactive solvent.

The vinyl monomer, or mixtures of vinyl monomers, may be employed over a broad range. At the lower end of the range, no vinyl monomer need be used. The upper end of the range is a moderate excess of vinyl monomer over the stoichiometric amount required to crosslink the ethylenic unsaturation of the first component. The amount of monomer should be sufficient to provide a liquid, flowable, interpolymerizable mixture. Ordinarily, the monomer will be present in the coating composition in the range of from about 0 to about 45 percent by weight of the binder of the coating composition. When used, the vinyl monomer will ordinarily be in the range of from about 15 to about 30 percent by weight of the binder.

Extender pigments which are generally transparent to both ultraviolet light and visible light are optional ingredients which are often included in the coating composition. Examples of suitable extender pigments are finely divided particles of silica, barytes, calcium carbonate, talc, magnesium silicate, aluminum silicate, etc. The extender pigments do not ordinarilyy provide significant additional hiding, but they accelerate the rate at which opacity is obtained. Extender pigment is generally present in an amount in the range of from about 0 to about 40 percent by weight of the coating composition. An amount in the range of from about 0 to about 15 percent is more often employed. When extender pigment is used, it is usually present in the range of from about 1 to about 15 percent by weight of the coating composition. Although a single extender pigment is ordinarily used, mixtures of several extender pigments are satisfactory.

Opacifying or coloring pigments may also be included in the ultraviolet light curable coating compositions. The amount of these pigments should not be so great as to seriously interfere with the curing of the binder. Dyes and tints may similarly be included.

Another optional ingredient which is often included in the coating composition is an inert volatile organic solvent. Mixtures of several inert volatile organic solvents may be used when desired. Like the extender pigment, the inert volatile organic solvent does not ordinarily provide significant additional hiding, but it accelerates the rate at which opacity is obtained. Examples of suitable inert volatile organic solvents are acetone, methyl ethyl ketone, methyl isobutyl ketone, methyl alcohol, ethyl alcohol, propyl alcohol, isopropyl alcohol, butyl alcohol, sec-butyl alcohol, isobutyl alcohol, tert-butyl alcohol, amyl alcohol, hexyl alcohol, 2-ethylhexyl alcohol, cellosolve, ethyl cellosolve, cellosolve acetate, 2-ethyhexyl acetate, tetrahydrofuran and aliphatic naphta. Solvent of this type is ordinarily present in the coating composition in the range of from about 0 to about 40 percent by weight of the vehicle of the coating composition. From about 0 to about 15 percent is typical. When inert volatile organic solvent is used, it is usually present in the range of from about 1 to about 15 percent by weight of the vehicle.

Photoinitiators, photosensitizers or both photoinitiators and photosensitizers are often included in ultraviolet light curable coating compositions.

Examples of photosensitizers which may be used are:
benzil
3,4-benzoflourene
1-naphthaldehyde
1-acetylnaphthalene
2,3-butanedione
1-benzoylnaphthalene
9-acetylphenanthrene
3-acetylphenanethrene
2-naphthaldehyde
2-acetylnaphthalene
2-benzoylnaphthalene
4-phenylbenzophenone
4-phenylacetophenone
anthraquinone
thioxanthone
3,4-methylenedioxyacetopheneone
4-cyanobenzophenone
4-benzoylpyridine
2-benzoylpyridine
4,4'-dichlorobenzophenone
4-trifluoromethylbenzophenone
3-methoxybenzophenone
4-chlorobenzophenone
3-chlorobenzophenone
3-benzoylpyridine
4-methoxybenzophenone
3,4-dimethylbenzophenone
4-methylbenzophenone
benzophenone
2-methylbenzophenone
4,4'-dimethylbenzophenone
2,5-dimethylbenzophenone
2,4-dimethylbenzophenone
4-cyanoacetophenone
4-fluorobenzophenone
o-benzoylbenzophenone
4,4'-dimethoxybenzophenone
4-acetylpyridine
3,4,5-trimethylacetophenone
4-methoxybenzaldehyde
4-methylbenzaldehyde 3,5-dimethylacetophenone
4-bromoacetophenone
4-methoxyacetophenone
3,4-dimethylacetophenone
benzaldehyde
triphenylmethylacetopenone
anthrone
4-chloroacetophenone
4-trifluoromethylacetophenone
2-chloroanthraquinone
ethyl phenylglyoxylate
o-benzoylbenzoic acid
ethyl benzoylbenzoate
dibenzosuberone
o-benzoylbenzophenone
acrylyloxyethyl benzoylbenzoate
4-acrylyloxybenzophenone
2-acrylyloxyethoxybenzophenone The preferred photosensitizer is benzophenone.
Examples of photoinitiators which may be used are:
benzoin
methyl benzoin ether
ethyl benzoin ether
isopropyl benzoin ether
butyl benzoin ether
isobutyl benzoin ether
benzoin acetate
benzoin phenyl carbamate
α,α-diethoxyacetophenone
α,α-diethoxy-α-phenylacetophenone
α,α-dimethoxy-α-phenylacetophenone
4,4'-dicarboethoxybenzoin ethyl ether
α-chloroacetophenone
α-bromoacetophenone
benzoin phenyl ether
α-methylbenzoin ethyl ether
benzoin acrylate
α-methylolbenzoin methyl ether
α,α,α-trichloroacetophenone
o-bromoacetophenone
4-(benzoylphenylmethoxycarbonylimino)-2-(acrylyloxyethoxycarbonylimino)-1-methylbenzene The preferred photoinitiators are isobutyl benzoin ether, mixtures of butyl isomers of butyl benzoin ether, and α,α-diethoxyacetophenone.

The photoiniator, photosensitizer or mixture of these is usually present in the ultraviolet light curable coating composition in an amount in the range of from about 0.01 percent to about 50 percent by weight of the binder of the coating composition. An amount in the range of from about 0.05 percent to about 10 percent is more often used. An amount in the range of from about 0.1 percent to about 5 percent is preferred.

Although several of the optional materials commonly found in ultraviolet light curable coating compositions have been described, the list is by no means inclusive. Other materials may be included for purposes known to the art.

The ultraviolet light curable coating compositions are used to form cured adherent coatints on substrates. The substrate is coated with the coating composition using substantially any technique known to the art. These include spraying, curtain coating, dipping, roller application, painting, brushing, drawing and extrusion. The coated substrate is then passed under a substantially symmetrical relfector system comprising four substantially elliptical cylindrical relfectors which reflect ultraviolet light from four generally linear parallel sources of ultraviolet light located at the first foci of the reflectors to the second foci thereof wherein (1) the reflector system has a plane of symmetry generally parallel to the four generally parallel sources of ultraviolet light, (2) the second foci are more remotely located from the reflectors than the first foci, (3) the second foci of two of the reflectors are superimposed to form a common focus, (4) the second foci of the other two of the reflectors are superimposed to form a second common focus, (5), the common foci are located in a plane perpendicular to the plane of symmetry, (6) the common foci are spaced apart by a distance in the range of from about 10 percent to about 50 percent of the distance between the two extreme first foci, (7) the eccentricity of the substantially elliptical cylindrical reflectors is in the range of from about 0.2 to about 0.9, (8) the coating vibrates toward and away from the reflectors about a mean position during the exposure, and (9) the coated substrate is passed under the reflector system such that the mean position of the coating is located more remotely from the reflectors than the plane containing the common foci and such that the coating is exposed to ultraviolet light of sufficient intensity for a time sufficient to crosslink the coating during the passage.

Cured coatings of the ultraviolet light curable coating composition usually have thicknesses in the range of from about 0.002 millimeter to about 3 millimeters. More often they have thicknesses in the range of from about 0.007 millimeter to about 0.3 millimeter.

Any suitable source which emits ultraviolet light, viz., electromagnetic radiation having a wavelength in the range of from about 180 to about 400 nanometers, may be used in the practice of this invention. Suitable sources are mercury arcs, carbon arcs, low pressure mercury lamps, medium pressure mecury lamps, high pressure mercury lamps, swirl-flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at both ends. Examples of these lamps are PPG Models 60-2032, 60--0393, 60--0197 and 60-2031 and Hanovia Models 6512A432, 6542A431, 6565A431 and 6577A431.

The times of exposure to ultraviolet light and the intensity of the ultraviolet light to which the coating composition is exposed may vary greatly. Generally the exposure to ultraviolet light should continue to the C-stage when hard, mar and abrasion resistant films of low gloss result. In certain applcations, however, it may be desirable for the curing to continue only to the B-stage.

Substrates which may be coated with the compositions of this invention may vary widely in their properties. Organic substrates such as wood, fiberboard, particle board, composittion board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys.

We claim:

1. In an ultraviolet light processor for exposing substrates coated with an ultraviolet light curable coating composition to ultraviolet light to cure said coating, said ultraviolet light processor having a substantially symmetrical reflector comprising four substantially elliptical cylindrical reflectors for reflecting ultraviolet light from four generally linear parallel sources of ultraviolet light located at the first foci of said reflectors to the second foci thereof, wherein:
   a. said reflector system has a plane of symmetry generally parallel to said four generally parallel first foci;
   b. said second foci are more remotely located from said reflectors than said first foci;
   c. the second foci of two of said reflectors are superimposed to form a first common focus;
   d. the second foci of the other two of said reflectors are superimposed to form a second common focus;
   e. said common foci are located in a plane perpendicular to said plane of symmetry;
   f. said common foci are spaced apart by a distance in the range of from about 10 percent to about 50 percent of the distance between the two extreme first foci;
   g. the eccectricity of said substantially elliptical cylindrical reflectors is in the range of from 0.2 to about 0.9;

the improvement comprising means for passing said coated substrate under said reflector system in an average direction which is generally parallel to said first foci such that the mean position of said coating is located more remotely from said reflectors than said plane containing said common foci.

2. The apparatus of claim 1 wherein the improvement comprises means for passing said coated substrate under said reflector system in an average direction which is generally parallel to said first foci such that the mean position of said coating is located more remotely from said reflectors than said plane containing said common foci by an amount which is in the range of from 1 percent to about 40 percent of the distance said second foci are located from the vertices of their respective reflectors.

3. The apparatus of claim 1 wherein said substantially elliptical reflectors have an eccentricity in the range of from about 0.6 to about 0.75.

4. The apparatus of claim 1 wherein said common foci are spaced apart by a distance in the range of from about 25 percent to about 35 percent of the distance between the two extreme first foci.

5. The apparatus of claim 1 wherein an ultraviolet light source is positioned at the first focus of each of said substantially elliptical cylindrical reflectors.

6. The apparatus of claim 5 wherein each ultraviolet light source is an ultraviolet light emitting lamp of the medium or high pressure mercury vapor type.

7. The apparatus of claim 6 wherein said ultraviolet light emitting lamp has a fused quartz envelope and is in the form of a long tube having an electrode at both ends.

* * * * *

UNITED STATES PATENT AND TRADEMARK OFFICE
CERTIFICATE OF CORRECTION

PATENT NO. : 4,037,112
DATED : July 19, 1977
INVENTOR(S) : Warren J. Ramler and James K. Lackore It is certified that error appears in the above-identified patent and that said Letters Patent are hereby corrected as shown below:

Column 3, line 22, "3,969" should be --3.969--.

Column 5, line 58, "2,2-dimethyl-33-hydroxypropyl" should be

--2,2-dimethyl-3-hydroxypropyl--.

Column 13, line 5, insert --system-- after "reflector".

Column 13, line 26, insert --about-- after "from".

Column 14, line 9, insert --about-- after "from".

Column 14, line 24, insert --said-- after "each".

Signed and Sealed this

Twenty-fifth Day of October 1977

[SEAL]

Attest:

RUTH C. MASON
Attesting Officer

LUTRELLE F. PARKER
Acting Commissioner of Patents and Trademarks